April 16, 1963     H. J. McDERMOTT     3,085,459

CUTTER FOR BEADED EDGE FILMS

Filed April 21, 1960

United States Patent Office 3,085,459
Patented Apr. 16, 1963

3,085,459
CUTTER FOR BEADED EDGE FILMS
Henry J. McDermott, Collingdale, Pa., assignor to American Viscose Corporation, Philadelphia, Pa., a corporation of Delaware
Filed Apr. 21, 1960, Ser. No. 23,731
4 Claims. (Cl. 83—431)

The invention relates to apparatus for slitting or trimming continuous traveling webs, films and like structures.

In general, in the manufacture of webs, films and like structures from materials such as paper, textiles, rubber and various plastic compounds, a continuous structure of standard width is initially formed and then trimmed to remove longitudinal edge portions. If desired, the trimmed continuous structure may be further slit longitudinally at transversely spaced intervals into narrower webs, as for example in the form of bands, tapes or ribbons. While longitudinal slitting of the continuous structure is often not necessary, trimming is usually effected to provide the structure with a uniform width or to remove specially shaped edge portions which assist in processing of the web or film during some intermediate stage in its manufacture. For example, in the production of films from polymeric materials, the film may be initially formed with beaded or enlarged longitudinal edges to facilitate gripping and stretching thereof along biaxial directions.

The known apparatus for effecting trimming or slitting of continuous webs or films is quite varied and includes such elements as stationary razor or knife blades, heated wires, and single or cooperating rotary disks. In using these conventional cutting means in slitting or trimming a continuous web or film, the web or film is tensioned and advanced longitudinally relative to the cutting means to thereby sever the same at one or more locations. It has been discovered, however, that the presence of slack in a direction transversely of the web or film often causes the web or film to ride under or along a conventional cutting blade or disk or between cooperating cutting disks without actually being cut. This result is especially pronounced when the cutting elements are not at their optimum sharpness and/or when a web or film of yieldable material is being trimmed or slit. Accordingly, a primary object of this invention is the provision of a generally new or improved and a more satisfactory apparatus for trimming or slitting continuous webs or films.

Another object is to provide an improved apparatus for effecting continuous longitudinal trimming or slitting of a traveling web or film without requiring that the web or film be tensioned in a transverse direction.

Still another object of the invention is the provision of a slitting apparatus including a pair of cutting blades which are adapted to be disposed in crossing relationship and together cooperate to sever a web or film as it is advanced longitudinally relative thereto.

A further object is to provide a slitting apparatus including a pair of cutting blades which are adapted to be adjusted into crossing relationship at different angles so as to present new cutting surfaces for severing a continuous web or film as it is advanced longitudinally relative thereto.

These and other objects, features, and advantages will become apparent from the folowing description of the invention and the drawing relating thereto in which.

Figure 1:
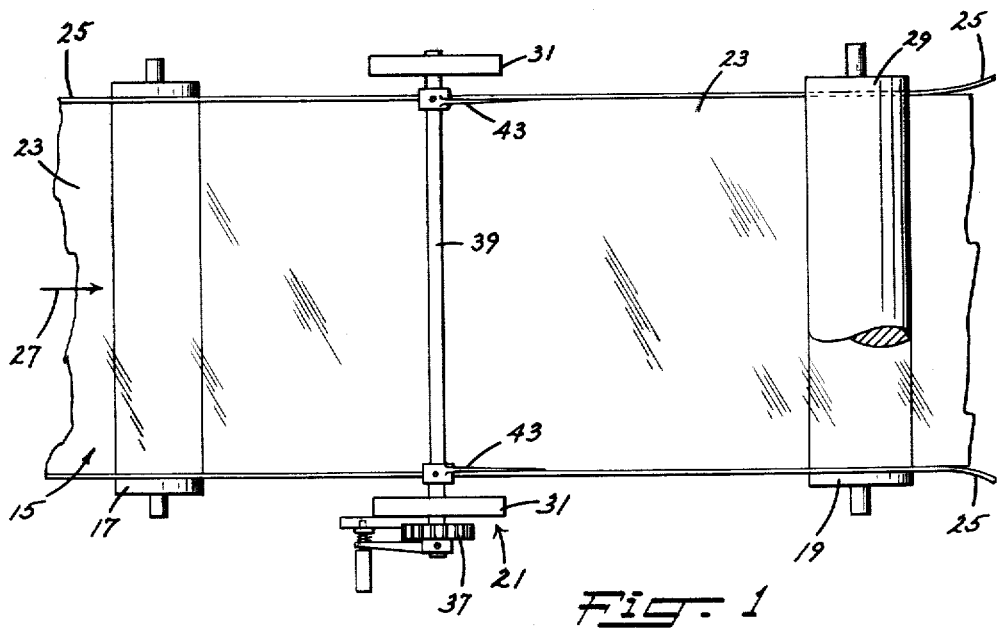
FIGURE 1 is a plan view of the apparatus of the present invention employed in trimming the beaded edges from a continuous plastic film.

In general, the present invention relates to an apparatus for longitudinally trimming or slitting an advancing continuous web or film. The apparatus includes at least one pair of cooperating blades which are mounted for simultaneous movement to and from an operative position wherein the blades are disposed in crossing relationship. The blades are each formed with pointed free-end portions which enable the blades to easily penetrate the film and are provided with opposing sharpened edge surfaces which, when disposed in crossing relationship, provide a nip and cooperate together to shear the web or film as it is advanced longitudinally relative thereto. In view of the shearing action effected by the cooperating stationary cutting blades, no special care need be exercised in tensioning the web or film in a transverse direction. To facilitate continuous trimming or slitting operations, the angular relationship of the crossing cutting blades may be periodically varied to expose the web or film being slit to new portions of the blade cutting edges.

The apparatus of the present invention is hereafter described as employed in the trimming of beaded or enlarged edges from a continuous polymeric film. It will be understood, however, that the apparatus is equally well adapted for trimming or slitting other materials which are of a continuous nature, such as textiles, paper, rubber, etc.

With reference to the drawing, a film 15 which is to be slit is passed over and between a pair of spaced rollers 17 and 19 which together serve to guide the film along a desired path as it is advanced relative to the slitting or severing apparatus of the present invention, indicated generally at 21. The film 15 is of conventional configuration, having a web 23 and beaded or enlarged longitudinal edges 25, and is advanced in the direction indicated by arrow 27 at a continuous and uniform rate by a driven roller 29, which is disposed above the roller 19 and forms therewith a nip for the film web 23.

The severing means 21 of the present invention is positioned between the rollers 17 and 19 and includes a suitable supporting structure having a pair of arms 31 which extend along opposite sides of the path of the film 15. An elongated shaft 33 is rotatably mounted between the arms 31 and includes a gear 35 which meshes with a similar gear 37 fixed to the shaft 39, which is also carried by the arms 31. Cutting blades 41 are each fixed at one end to the shaft 33 and are adapted to be disposed in crossing relationship with similar cutting blades 43 fixed to the shaft 39. The cutting blades 41 and 43 are tapered at 45 to provide pointed free end portions, which enable the blades to easily penetrate the film being slit, and opposing sharpened edges 47.

Figure 3:
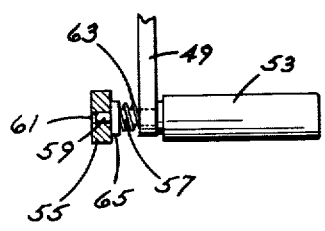
FIGURE 3 is a fragmentary sectional view taken along the line III—III of FIGURE 2.

In view of the gear connection between the shafts 33 and 39 simultaneous movement of the blades 41 and 43 toward and away from each other is achieved by turning one of the shafts 33 or 39 in the proper direction. As illustrated, an adjusting arm 49 is fixed at one end to the shaft 33, said arm carrying, at its free end, an operating handle 53 which is movable relative to a fixed arc 55. The operating handle 53, as best seen in FIGURE 3, includes a portion 57 of reduced diameter which slidably extends through the adjusting arm 49 and terminates with a pin 59 which is adapted to be received in any one of a series of openings 61 formed in the arc 55. The operating handle 53 is resiliently urged toward the arc 55 by a compression spring 63 which is interposed between the arm 49 and a disk or washer 65 fixed to the reduced handle portion 57.

In using the apparatus of the present invention for trimming the beaded or enlarged edges 25 from a film 15, the cutting blades 41 and 43 are initially adjusted on the respective shafts 33 and 39 to a transverse spacing corresponding to the width desired in the resulting slit web. With the cutting blades disposed in inoperative position, as shown by broken lines in FIGURE 2, the beaded edge film 15 is laced over the guide roller 17 and between the rollers 19 and 29. As the film 15 is brought up to a continuous and uniform speed by the driven roll 29, the pin 59 of the operating handle 53 is pulled outwardly away from the arc 55 after which the arm 49 is moved in a counterclockwise direction, as viewed in FIGURE 2. In view of the cooperation between meshing gears 35 and 37, the shafts 33 and 39 are simultaneously rotated to urge the blades 41 and 43 through the film 15 and into crossing relation, as indicated in solid lines in FIGURE 2. The blades 41 and 43 are locked in position by merely allowing the spring 65 to resiliently urge the operating handle pin 59 into an adjacent opening 61 in the arc 55.

Once in adjusted position, the blades 41 and 43 together cooperate to shear the beaded edges 25 from the film 15 as the film is longitudinally tensioned and advanced by the rolls 19 and 29. One important consideration in the use of the slitting apparatus of the present invention is that the cutting blades 41 and 43 effect a uniform shearing action on the film 15 regardless of fluctuations in the transverse film tensions. This highly advantageous shearing action therefore eliminates the need for any special film tensioning mechanisms and readily adapts the apparatus here described for use with materials which tend to yield, such as polymeric films, textiles, rubber, etc.

It will of course be understood that only a single pair of cooperating cutting blades may be used and that additional pairs of cutting blades, similar to the blades 41 and 43 described above, may be fixed to the shafts 33 and 39 to effect slitting of the film 15 into any desired number of independent bands, tapes or ribbons.

Figure 2:
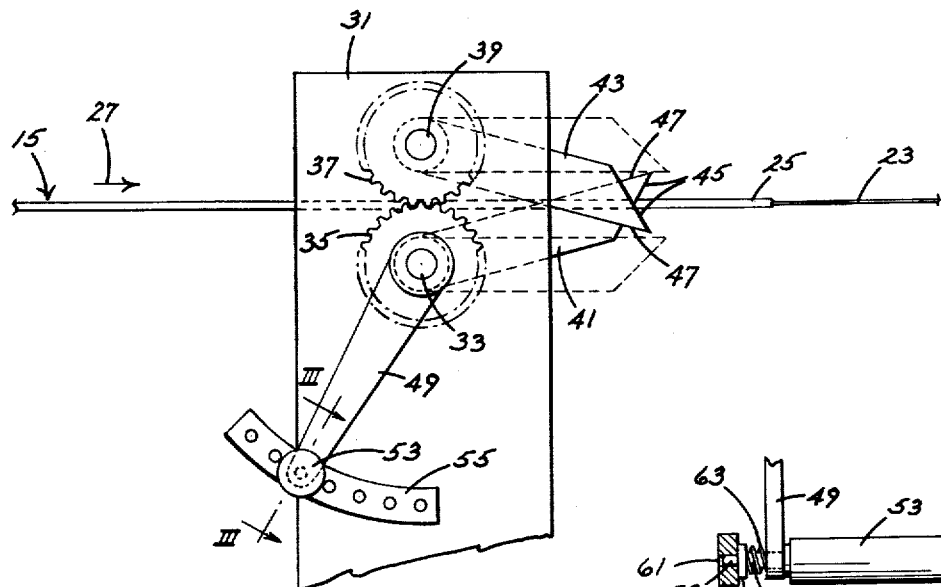
FIGURE 2 is a side view of the structure shown in FIGURE 1 on an enlarged sale.

As wear is occasioned along those portions of the blade cutting edges 47 which are actually shearing the film 15, the arm 49 may be merely further adjusted in a counterclockwise direction, as viewed in FIGURE 2, to thereby expose the film to new portions of the blade cutting edges.

While preferred embodiments of the invention have been shown and described, it is to be understood that changes and variations may be made without departing from the spirit and scope of the invention as defined in the appended claims.

I claim:

1. Apparatus for slitting a continuous web including a pair of spaced web guiding means, means for advancing a continuous web under tension over and between said web guiding means, and means for severing the continuous web along a direction substantially parallel to its longitudinal axis as it is advanced between said guiding means, said severing means including a blade positioned along each of the opposite sides of the path of travel of the web, said blades having opposing substantially straight, cutting edges, and means for moving said blades through the continuous web and into overlapping crossing relationship whereby the opposed cutting edges thereof provide a nip and cooperate together to shear the web as it is advanced into and relative to said nip, said last mentioned means being adjustable to permit variation in the crossing relationship of said blades and thereby cause different portions of the blade cutting edges to be exposed to the continuous web during the slitting thereof.

2. Apparatus as defined in claim 1 wherein said blades are provided with pointed end portions to facilitate their movement through the web as they are moved into operative position.

3. Apparatus as defined in claim 1 further including means operative on said blade pivot means for moving said blades simultaneously toward and away from each other.

4. Apparatus for trimming the beaded edge portions from a continuous beaded edge thermoplastic film including a pair of spaced film guiding means, means for advancing a continuous beaded edge film over and between said film guiding means, and means for severing opposite beaded edges of the continuous film along directions substantially parallel to its longitudinal axis as it is advanced between said guiding means, said severing means including pairs of blades disposed in laterally spaced relationship with the blades of each pair of blades positioned along opposite sides of the film path as it is advanced between said film guiding means, the blades of each pair of blades having substantially straight opposed cutting edges, means supporting the blades of each pair of blades for pivotal movement toward and away from each other, and means for moving the blades of each pair of blades simultaneously through the continuous film and into overlapping crossing relationship whereby the opposed cutting edges of each pair of blades provide a nip and cooperate together to shear the film as it is advanced into and relative to said nip, said last mentioned means being adjustable to permit variations in the crossing relationship of the blades to thus enable different portions of the blade cutting edges to be exposed to the continuous film during the trimming thereof.

References Cited in the file of this patent

UNITED STATES PATENTS

| 304,545 | Newell | Sept. 2, 1884 |
|---|---|---|
| 1,356,271 | Dozier | Oct. 19, 1920 |
| 1,619,305 | Norris | Mar. 1, 1927 |
| 1,647,837 | Mason | Nov. 1, 1927 |
| 2,203,255 | Deane | June 4, 1940 |
| 2,706,524 | Hall | Apr. 19, 1955 |

FOREIGN PATENTS

| 16,593/34 | Australia | Mar. 21, 1935 |

UNITED STATES PATENT OFFICE
CERTIFICATE OF CORRECTION

Patent No. 3,085,459 April 16, 1963

Henry J. McDermott

It is hereby certified that error appears in the above numbered patent requiring correction and that the said Letters Patent should read as corrected below.

Column 4, line 54, strike out "FOREIGN PATENTS", line 55, strike out "16,593/34 Australia ------ Mar. 21, 1935".

Signed and sealed this 20th day of August 1963.

(SEAL)
Attest:

ERNEST W. SWIDER
Attesting Officer

DAVID L. LADD
Commissioner of Patents